United States Patent Office 3,104,244
Patented Sept. 17, 1963

3,104,244
17-OXYGENATED 2β-FLUORO-5α-ANDROSTAN-3-ONES AND INTERMEDIATES THERETO
Raymond E. Counsell, Skokie, and Paul D. Klimstra, Northbrook, Ill., assignors to G. D. Searle & Co., Chicago, Ill., a corporation of Delaware
No Drawing. Filed Mar. 16, 1962, Ser. No. 180,335
Claims priority, application Great Britain June 5, 1961
9 Claims. (Cl. 260—397.3)

The present invention relates to 2β-fluoro steroids and, more particularly, to 17-oxygenated 2β-fluoro-5α-androstan-3-ones of the structural formula

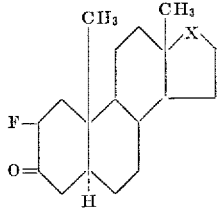

wherein X represents a carbonyl, β-hydroxymethylene, or β-(lower alkanoyl)oxymethylene radical.

Novel intermediates useful in the manufacture of those 3-keto substances are represented by structural formula

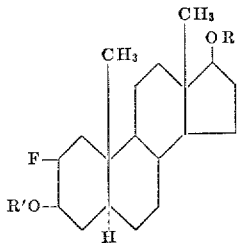

wherein R and R' can be hydrogen or a lower alkanoyl radical.

The lower alkanoyl radicals denoted in the above formulas are exemplified by formyl, acetyl, propionyl, butyryl, valeryl, caproyl, and the branched-chain groups isomeric therewith.

The novel compounds of this invention are conveniently prepared by processes utilizing as starting materials, compounds of the structural formula

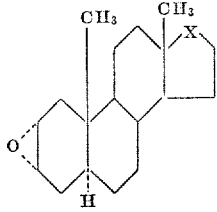

wherein X is a carbonyl, β-hydroxymethylene, or β-(lower alkanoyl)oxymethylene group. Reaction of those substances with anhydrous hydrogen fluoride in an organic solvent medium produces the corresponding 2β,3α-fluorohydrins. For example, 2α,3α-epoxy-5α-androstan-17β-ol 17-acetate in tetrahydrofuran containing chloroform is allowed to react with anhydrous hydrogen fluoride to afford 17β-acetoxy-2β-fluoro-5α-androstan-3α-ol. Esterification of this 3α-hydroxy compound with acetic anhydride in pyridine produces 2β-fluoro-5α-androstane-3α,17β-diol 3,17-diacetate, which is hydrolyzed with aqueous sodium carbonate in methanol to produce the free 3α,17β-diol. This diol is converted to 2β-fluoro-5α-androstane-3,17-dione by oxidation, suitably with aqueous chromic acid. The aforementioned 17β-acetoxy-2β-fluoro-5α-androstan-3α-ol can be oxidized, for example with the chromium trioxide-sulfuric acid reagent to yield 17β-acetoxy-2β-fluoro-5α-androstan-3-one. Hydrolysis, typically with aqueous sodium carbonate in methanol, affords 2β-fluoro-17β-hydroxy-5α-androstan-3-one, which is oxidized with chromium trioxide in aqueous sulfuric acid to yield 2β-fluoro-5α-androstane-3,17-dione. An alternate route to this 3,17-dione utilizes 2α,3α-epoxy-5α-androstan-17-one as starting material. Reaction with anhydrous hydrogen fluoride in tetrahydrofuran-chloroform affords 2β-fluoro-3α-hydroxy-5α-androstan-17-one, which is allowed to react with the aforementioned oxidizing mixture, consisting of chromium trioxide in aqueous sulfuric acid, to yield the instant 2β-fluoro-5α-androstane-3,17-dione.

2α,3α-epoxy-5α-androstan-17β-ol 17β-acetate, described above, is hydrolyzed, suitably by means of methanolic aqueous sodium carbonate to yield 2α,3α-epoxy-5α-androstan-17β-ol. Treatment of that substance with an alkanoic acid anhydride in pyridine affords the 2α,3α-epoxy-5α-androstan-17β-ol 17-(lower alkanoates), which are converted to the corresponding 17β-(lower alkanoyl) oxy compounds of this invention by the processes described above. Reaction of that 17β-ol with propionic anhydride and pyridine, for example, affords 2α,3α-epoxy-5α-androstan-17β-ol 17-propionate.

The 3-keto compounds of this invention are useful as a result of their valuable pharmacological properties. They are, for example, anti-estrogenic agents as is evidenced by their ability to inhibit estrogen-stimulated biological responses. They are particularly useful in view of the absence of potent anabolic and androgenic side-effects. The 3α-ols and 3α-(lower alkanoates) of this invention are useful as intermediates, as is apparent from the above disclosure.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a solution of 10.4 parts of anhydrous hydrogen fluoride in 13.5 parts of chloroform containing 16.9 parts of tetrahydrofuran is added dropwise with stirring, at about —20°, an ice-cold solution of 5.6 parts of 2α,3α-epoxy-17β-hydroxy-5α-androstan-17β-ol 17-acetate in 52.5 parts of chloroform. This addition requires about two hours. Stirring is continued for about one hour longer, while the solution is allowed to warm to room temperature. The reaction mixture is then rapidly stirred and cautiously poured into ice-cold aqueous potassium carbonate. This aqueous mixture is extracted with chloroform, and the aqueous layer is separated and extracted again with chloroform. The combined extracts are washed with water, dried over anhydrous potassium carbonate containing decolorizing carbon, and stripped of solvent at reduced pressure to afford a solid residue. This residue is chromatographed on silica gel, then eluted with 5% ethyl acetate in benzene to afford pure 17β-acetoxy-2β-fluoro-5α-androstan-3α-ol, which melts at about 204.5–205.5° and displays an optical rotation of +12° in chloroform. It is represented by the formula

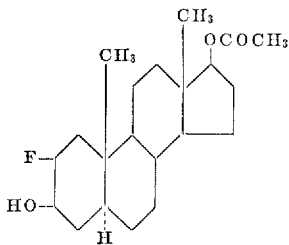

*Example 2*

To a solution of one part of 17β-acetoxy-2β-fluoro-5α-androstan-3α-ol in 16 days of acetone is added dropwise an aqueous solution, 8 N in chromium trioxide and 8 N in sulfuric acid, until a slight excess of the oxidant is present, as is evidenced by the persistence of the brown color of the reagent. Approximately 0.2 part of isopropyl alcohol is then added to destroy the excess reagent and the supernatant liquid is decanted from the resulting precipitated salts, then is poured into a mixture of ice and water. The resulting precipitate is collected by filtration, washed with water, and recrystallized from acetone-hexane to afford pure 17β-acetoxy-2β-fluoro-5α-androstan-3-one, M.P. about 153–154°; [α]$_D$=+38°. It is represented by the structural formula

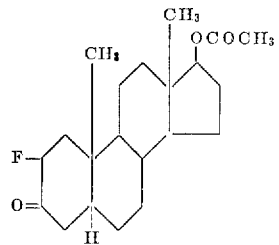

*Example 3*

To a solution of 10 parts of 17β-acetoxy-2β-fluoro-5α-androstan-3-one in 400 parts of methanol is added a solution of 2 parts of sodium carbonate and 50 parts of water, and this reaction mixture is heated at 50–60° for about 5 minutes, then is cooled. The precipitate which forms is collected by filtration and dried to yield 2β-fluoro-17β-hydroxy-5α-androstan-3-one of the formula

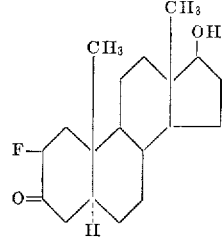

*Example 4*

The reaction of one part of 2β-fluoro-17β-hydroxy-5α-androstan-3-one with the chromium trioxide-sulfuric acid aqueous reagent described in Example 2, by the procedure of that example, results in 2β-fluoro-5α-androstane-3,17-dione, M.P. about 142–143°; [α]$_D$=+123° (chloroform). This compound is represented by the formula

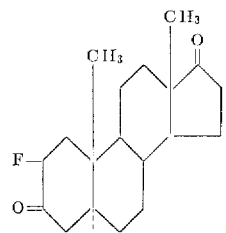

*Example 5*

A mixture of 1.6 parts of 17β-acetoxy-2β-fluoro-5α-androstan-3α-ol, 8.1 parts of acetic anhydride, and 10.5 parts of pyridine is stirred for about 16 hours at room temperature, then is poured into a mixture of ice and water. The resulting precipitate is collected by filtration, then is washed successively with dilute hydrochloric acid and water, dried, and recrystallized from acetone-hexane to produce 2β-fluoro-5α-androstane-3α,17β-diol 3,17-diacetate, M.P. about 175–177°; [α]$_D$=+37° (chloroform). It is represented by the structural formula

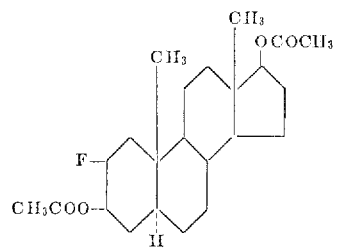

This diacetate can be obtained also by substituting 1.4 parts of 2β-fluoro-5α-androstane-3α,17β-diol in the process of this example.

*Example 6*

By substituting 5.65 parts of 2β-fluoro-5α-androstane-3α,17β-diol 3,17-diacetate and otherwise proceeding according to the processes described in Example 3, 2β-fluoro-5α-androstane-3α,17β-diol, M.P. about 242–244°, is obtained. It is represented by the formula

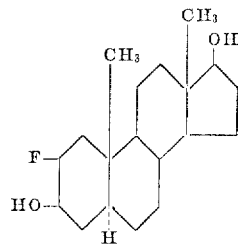

*Example 7*

The substitution of one part of 2β-fluoro-5α-androstane-3α,17β-diol in the procedure of Example 2 results in 2β-fluoro-5α-androstane-3,17-dione, M.P. about 142–143°, identical with the product of Example 4.

*Example 8*

Into a mixture of 33.7 parts of tetrahydrofuran in 21 parts of chloroform, cooled to about −20°, is bubbled 20.8 parts of anhydrous hydrogen fluoride. This solution is cooled and stirred while a solution of 12 parts of 2α,3α-epoxy-5α-androstan-3-one in 96 parts of chloroform is added dropwise over a period of about 2½ hours, during which time the addition of hydrogen fluoride is continued. After completion of the addition, the reaction mixture is stirred for about 1½ hours longer while it is warming to room temperature. This solution is then poured into excess concentrated aqueous potassium carbonate, and the aqueous mixture is extracted with chloroform. The organic extract is washed successively with water, 5% aqueous sodium bicarbonate, and water, dried over anhydrous potassium carbonate containing decolorizing carbon and concentrated to dryness to afford an oily residue. Chromatography of that residue on silica gel followed by elution with 12–13% ethyl acetate in benzene affords crude 2β-fluoro-3α-hydroxy-5α-androstan-17-one. Recrystallization from acetone-hexane produces a pure sample, which melts at about 184–185° and is further characterized by an optical rotation, in chloroform, of +97°. This compound is represented by the formula

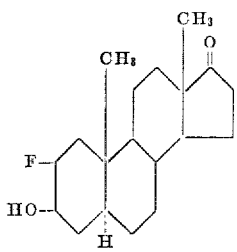

Example 9

To a solution of one part of 2β-fluoro-3α-hydroxy-5α-androstan-17-one in 20 parts of isopropyl alcohol is added a solution of 0.7 part of sodium borohydride in 4 parts of isopropyl alcohol containing 1.5 parts of water. This reaction mixture is stirred at room temperature for about 3 hours, then is diluted with ice and water. The resulting precipitate is collected by filtration, washed with water, dried, and recrystallized from aqueous ethanol to afford pure 2β-fluoro-5α-androstane-3α,17β-diol, M.P. about 242–244°. It is identical with the product of Example 6.

Example 10

To a cooled solution of 4 parts of 2β-fluoro-3α-hydroxy-5α-androstan-17-one in 40 parts of acetone is added dropwise, with rapid stirring, a slight excess of an aqueous solution, 8 N in chromium trioxide and 8 N in sulfuric acid. The solution is poured into an ice-water mixture and the resulting oily product is extracted into methylene chloride. The organic extract is washed with water, dried over anhydrous potassium carbonate containing decolorizing carbon, and stripped of solvent in vacuo to afford an oil which solidifies on standing. Recrystallization from aqueous methanol yields pure 2β-fluoro-5α-androstane-3,17-dione, melting at about 142–143° and displaying an optical rotation in chloroform of +123°. It is identical with the product of Example 4.

Example 11

The substitution of 9.5 parts of 2α,3α-epoxy-5α-androstan-17β-ol 17-acetate in the procedure of Example 3 results in 2α,3α-epoxy-5α-androstan-17β-ol, M.P. about 183–184°.

Example 12

A mixture of one part of 2α,3α-epoxy-5α-androstan-17β-ol, 10 parts of propionic anhydride, and 20 parts of pyridine is stored at room temperature for about 3 hours, then is poured into a mixture of ice and water. The resulting aqueous mixture is extracted with benzene, and the organic extract is washed successively with water and dilute hydrochloric acid, dried over anhydrous potassium carbonate, and stripped of solvent at reduced pressure to yield 2α,3α-epoxy-5α-androstan-17β-ol 17-propionate.

Example 13

The substitution of 5.85 parts of 2α,3α-epoxy-5α-androstan-17β-ol 17-propionate in the procedure of Example 1 results in 2β-fluoro-17β-propionoxy-5α-androstan-3α-ol of the structural formula

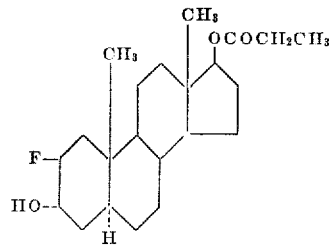

Example 14

By substituting one part of 2β-fluoro-17β-propionoxy-5α-androstan-3α-ol and otherwise proceeding according to the processes of Example 2, 2β-fluoro-17β-propionoxy-5α-androstan-3-one of the structural formula

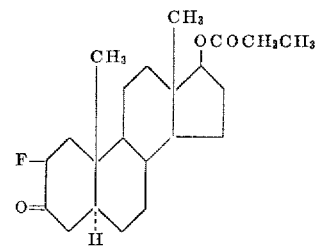

is obtained.

Example 15

The hydrolysis of 10.4 parts of 2β-fluoro-17β-propionoxy-5α-androstan-3-one by the processes described in Example 3 affords 2β-fluoro-17β-hydroxy-5α-androstan-3-one, identical with the product of that example.

Example 16

The reaction of 1.67 parts of 2β-fluoro-17β-propionoxy-5α-androstan-3α-ol with 10.3 parts of propionic anhydride according to the procedure of Example 5 results in 2β-fluoro-5α-androstane-3α,17β-diol 3,17-dipropionate of the structural formula

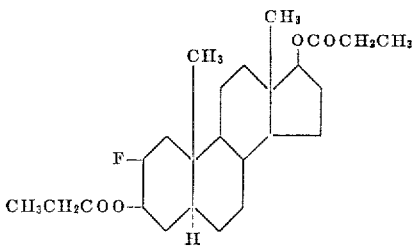

What is claimed is:
1. A compound of the formula

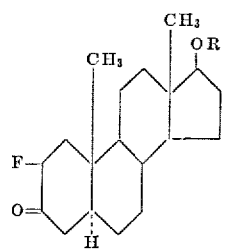

wherein R is selected from the group consisting of hydrogen and lower alkanoyl radicals.

2. 17β-acetoxy-2β-fluoro-5α-androstan-3-one.
3. 2β-fluoro-17β-hydroxy-5α-androstan-3-one.
4. 2β-fluoro-5α-androstane-3,17-dione.
5. A compound of the formula

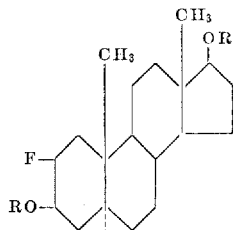

wherein R is selected from the group consisting of hydrogen and lower alkanoyl radicals.
6. 2β-fluoro-5α-androstane-3α,17β-diol.
7. 2β-fluoro-5α-androstane-3α,17β-diol 3,17 - diacetate.

8. A compound of the formula

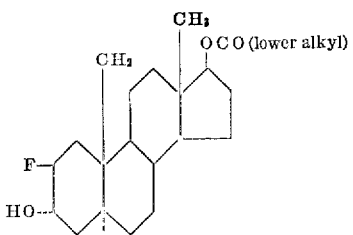

9. 17β-acetoxy-2β-fluoro-5α-androstan-3α-ol.

References Cited in the file of this patent
UNITED STATES PATENTS
3,009,934    Counsell et al. _____ Nov. 21, 1961

OTHER REFERENCES
Dorfman et al.: Androgens, John Wiley & Sons, Inc., New York, New York, pp. 590, 1956 (pages 98, 99, 101, 104, 124).

Nathan et al.: J.A.C.S. 82, 1436–1437, March 20, 1960.

Kissman et al.: J.A.C.S. 82, 2312–2317, May 1960.

UNITED STATES PATENT OFFICE
CERTIFICATE OF CORRECTION

Patent No. 3,104,244            September 17, 1963

Raymond E. Counsell, et al.

It is hereby certified that error appears in the above numbered patent requiring correction and that the said Letters Patent should read as corrected below.

Column 2, line 28, for "(lower alkanoyl)" read -- (lower alkanoyl)- --; column 3, line 26, for "16 days" read -- 16 parts --; column 7, lines 8 to 16, the lower portion of the formula should appear as shown below instead of as in the patent:

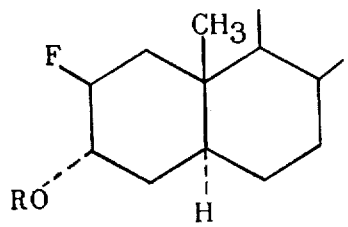

column 8, lines 2 to 12, the lower portion of the formula should appear as shown below instead of as in the patent:

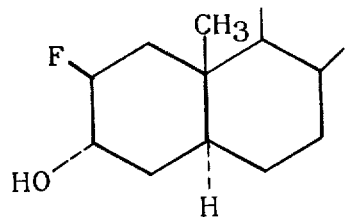

Signed and sealed this 5th day of May 1964.

(SEAL)
Attest:

ERNEST W. SWIDER
Attesting Officer

EDWARD J. BRENNER
Commissioner of Patents